US012439864B2

(12) United States Patent
Shay et al.

(10) Patent No.: US 12,439,864 B2
(45) Date of Patent: Oct. 14, 2025

(54) SYSTEM AND METHOD FOR REVERSIBLY COVERING A ZONE

(71) Applicant: Slide2Seal Ltd., Kerem Ben Zimra (IL)

(72) Inventors: Eyal Shay, Yiron (IL); Johanan Raviv, Ramat Gan (IL); Yoram Nir, Yesud Hamaala (IL)

(73) Assignee: SLIDE2SEAL LTD., Kerem Ben Zimra (IL)

( * ) Notice: Subject to any disclaimer, the term of this patent is extended or adjusted under 35 U.S.C. 154(b) by 677 days.

(21) Appl. No.: 17/760,613

(22) PCT Filed: Sep. 15, 2020

(86) PCT No.: PCT/IL2020/051007
§ 371 (c)(1),
(2) Date: Mar. 15, 2022

(87) PCT Pub. No.: WO2021/053664
PCT Pub. Date: Mar. 25, 2021

(65) Prior Publication Data
US 2022/0287250 A1    Sep. 15, 2022

Related U.S. Application Data

(60) Provisional application No. 62/900,759, filed on Sep. 16, 2019.

(51) Int. Cl.
*A01G 13/37*      (2025.01)
*A01G 13/29*      (2025.01)
(Continued)

(52) U.S. Cl.
CPC ............. *A01G 13/37* (2025.01); *E04H 4/101* (2013.01); *A01G 9/227* (2013.01); *A01G 13/29* (2025.01);
(Continued)

(58) Field of Classification Search
None
See application file for complete search history.

(56) References Cited

U.S. PATENT DOCUMENTS 2,754,900 A  *  7/1956  Karobonik ................ E04H 4/10
                                                         160/331
2,950,727 A  *  8/1960  Dunn ....................... E04F 10/02
                                                         52/63

(Continued)

FOREIGN PATENT DOCUMENTS

AU          610508 A1    5/1991
DE        29920243 U1    8/2000
(Continued)

*Primary Examiner* — Phi D A
(74) *Attorney, Agent, or Firm* — Wood, Phillips, Katz, Clark & Mortimer

(57) ABSTRACT

A rail element is provided having a longitudinal axis, a first longitudinal end and a second longitudinal end longitudinally spaced from the first end along the longitudinal axis. The rail element includes a rail body longitudinally extending between the first longitudinal end and the second longitudinal end, the rail body defining therein at least one longitudinally extending first lumen having a longitudinally co-extensive transverse first opening, the rail element being configured for being mounted to at least one longitudinal support member in load bearing contact therewith in operation of the rail element. The rail element is configured for being mounted to the at least one longitudinal support member in a non-longitudinal manner A system for covering an area incorporating such rail elements is also provided, as well as a method for using such a system.

18 Claims, 10 Drawing Sheets

(51) Int. Cl.
*E04H 4/10* (2006.01)
*A01G 9/22* (2006.01)
*E04D 13/035* (2006.01)
*E04F 10/06* (2006.01)
*E04H 7/22* (2006.01)

(52) U.S. Cl.
CPC ........ *E04D 13/035* (2013.01); *E04F 10/0607* (2013.01); *E04H 2007/225* (2013.01)

(56) References Cited

U.S. PATENT DOCUMENTS

| | | | | |
|---|---|---|---|---|
| 3,051,232 | A * | 8/1962 | Lamb | E04F 10/0607 160/368.1 |
| 3,240,217 | A * | 3/1966 | Bird | E04H 15/22 135/124 |
| 3,979,782 | A * | 9/1976 | Lamb | E04H 4/10 4/502 |
| 3,982,361 | A * | 9/1976 | Deutsch | E04H 15/60 52/222 |
| 4,036,244 | A * | 7/1977 | Huddle | E04H 15/40 52/63 |
| 4,137,687 | A * | 2/1979 | Sprung | E04H 15/32 52/63 |
| RE30,044 | E * | 7/1979 | Huddle | E04H 15/644 52/63 |
| 4,467,571 | A * | 8/1984 | Logan | E04H 15/648 |
| 4,686,717 | A * | 8/1987 | MacDonald | E04H 4/101 4/502 |
| 4,744,403 | A * | 5/1988 | Hausmann | E04F 10/0607 160/310 |
| 4,899,797 | A * | 2/1990 | Green | F16B 5/0692 160/395 |
| 5,123,474 | A | 6/1992 | Smith | |
| 5,333,425 | A * | 8/1994 | Nickerson | E04H 15/644 52/273 |
| 5,349,707 | A * | 9/1994 | Last | E04H 4/101 4/502 |
| 5,762,393 | A | 6/1998 | Darmas | |
| 5,920,922 | A * | 7/1999 | Ragsdale | E04H 4/101 4/502 |
| 6,904,720 | B1 * | 6/2005 | Adolfson | E04G 21/24 52/762 |
| 7,849,639 | B2 * | 12/2010 | Sprung | E04H 15/644 52/63 |
| 8,056,602 | B1 * | 11/2011 | Green | E06B 9/52 160/395 |
| 8,959,854 | B1 * | 2/2015 | Bucklin | E04H 15/644 160/396 |
| 10,352,065 | B2 * | 7/2019 | Grumberg | E04H 15/646 |
| 2012/0180961 | A1 | 7/2012 | Lin | |
| 2019/0054806 | A1 | 2/2019 | Getzschman et al. | |

FOREIGN PATENT DOCUMENTS

| | | | | |
|---|---|---|---|---|
| DE | 10150707 | C1 * | 2/2003 | B66B 7/027 |
| EP | 0167500 | A2 * | 8/1986 | |
| EP | 1566518 | A1 | 8/2005 | |
| EP | 2018987 | A1 | 1/2009 | |
| EP | 2045436 | B1 | 12/2011 | |
| EP | 1491712 | B1 | 8/2014 | |
| EP | 2441911 | B1 | 8/2015 | |
| EP | 3162603 | A1 | 5/2017 | |
| EP | 1083347 | A2 | 3/2021 | |
| FR | 2587405 | A1 * | 3/1987 | |
| FR | 2595109 | A1 * | 9/1987 | |
| FR | 2867498 | A1 * | 9/2005 | E04H 4/101 |
| FR | 2947298 | A1 | 12/2010 | |
| GB | 2251777 | A1 | 7/1992 | |
| JP | S63165260 | A * | 7/1988 | |
| WO | WO-0009831 | A1 * | 2/2000 | E04F 10/02 |

* cited by examiner

FIG. 3 DETAIL A

DETAIL B

SYSTEM AND METHOD FOR REVERSIBLY COVERING A ZONE

TECHNOLOGICAL FIELD

The presently disclosed subject matter relates to systems and methods or covering a zone, in particular a ground zone such as an agricultural ground area.

BACKGROUND

Certain zones, for example a ground zone such as an agricultural ground area, sometimes require to be reversibly covered. For example, it may be desired or necessary, to protect the ground zone from any one of sun light in general or UV radiation in particular, hail, frost, rain, and/or to provide thermal protection or protection against insects, birds or other pests.

GENERAL DESCRIPTION

According to a first aspect presently disclosed subject matter there is provided a rail element having a longitudinal axis, a first longitudinal end and a second longitudinal end longitudinally spaced from the first end along the longitudinal axis, the rail element comprising a rail body longitudinally extending between said first longitudinal end and said second longitudinal end, said rail body defining therein at least one longitudinally extending first lumen having a longitudinally co-extensive transverse first opening, the rail element being configured for being mounted to at least one longitudinal support member in load bearing contact therewith in operation of the rail element, wherein said rail element is configured for being mounted to the at least one longitudinal support member in a non-longitudinal manner and/or in a non-longitudinal direction, for example in a transverse mounting direction/manner.

For example, said transverse first opening has a first opening dimension, orthogonal to the longitudinal axis, and wherein said at least one first lumen has a first transverse cross-section having a first internal transverse dimension parallel to said first opening dimension, wherein said first internal transverse dimension is greater than said first opening dimension.

Additionally or alternatively, for example, said first transverse cross-section is any one of: circular, oval, rectangular, elliptical, superelliptical.

Additionally or alternatively, for example, said rail body defining therein at least one longitudinally extending second lumen having a longitudinally co-extensive transverse second opening, wherein said at least one longitudinally extending second lumen is transversely spaced with respect to said at least one longitudinally extending first lumen. For example, said transverse second opening has a second opening dimension, orthogonal to the longitudinal axis, and wherein said at least one second lumen has a second transverse cross-section having a second internal transverse dimension parallel to said second opening dimension, wherein said second internal transverse dimension is greater than said second opening dimension. Additionally or alternatively, for example, said second transverse cross-section is any one of: circular, oval, rectangular, elliptical, superelliptical.

Additionally or alternatively, for example, said rail body defining therein at least one longitudinally extending third lumen configured for being in load-bearing relationship with respect to a respective at least one said longitudinal support member at least in operation of the rail element.

In at least one example, said at least one third lumen comprises a longitudinally co-extensive lateral third opening, wherein said at least one longitudinally extending third lumen is transversely spaced at least with respect to said at least one longitudinally extending first lumen. For example, said transverse third opening has a third opening dimension, orthogonal to the longitudinal axis, and wherein said at least one third lumen has a third transverse cross-section having a third internal transverse dimension parallel to said third opening dimension, wherein said third internal transverse dimension is greater than said third opening dimension. Additionally or alternatively, for example, said third transverse cross-section is complementary to a transverse cross section of the respective at least one longitudinal support member. Additionally or alternatively, for example, said third transverse cross-section is any one of: circular, oval, rectangular, elliptical, superelliptical.

In at least one other example, said rail body is made from at least two rail body portions, including at least a first rail portion and a second rail portion, wherein the first rail portion and the second rail portion each define therein a respective one of a third lumen first part and third lumen second part, said rail body having an assembled configuration wherein the first rail portion and the second rail portion are assembled together and the third lumen first part and the third lumen second part form the third lumen, and a disassembled configuration in which the third lumen first part is spaced from the third lumen second part and enables the at least one longitudinal support member to be inserted into one or the other of the third lumen first part or the third lumen second part in a non-longitudinal direction and/or a non-longitudinal manner. For example, wherein said first rail portion and the second rail portion are configured for locking with respect to one another in said assembled configuration. Additionally or alternatively, said first rail portion and the second rail portion are hinged with respect to one another via a hinge arrangement, and wherein said first rail portion and the second rail portion are pivotable via said hinge arrangement between said disassembled configuration and said assembled configuration. Additionally or alternatively, the first rail portion and the second rail portion each define therein a respective one of a first lumen first part and first lumen second part, wherein in said assembled configuration the first lumen first part and the first lumen second part form the first lumen, and wherein in the disassembled configuration the first lumen first part is spaced from the first lumen second part. Additionally or alternatively, the first rail portion and the second rail portion each define therein a respective one of a second lumen first part and second lumen second part, wherein in said assembled configuration the second lumen first part and the second lumen second part form the second lumen, and wherein in the disassembled configuration the second lumen first part is spaced from the second lumen second part. Additionally or alternatively, at least one of said at least one first lumen and said at least one second lumen is defined in said first rail portion.

According to a second aspect of the presently disclosed subject matter there is provided a system for reversibly covering a zone, for example in spaced relationship therewith, for example in vertically spaced relationship therewith, the system comprising at least one module (interchangeably referred herein as an overlying module or as a covering module) including a first rail element, a second rail element, a strip panel element, and a first bobbin, the module having a first module longitudinal end and a second module longitudinal end, wherein:

the first rail element is a rail element as defined herein according to the first aspect of the presently disclosed subject matter, and wherein first rail element longitudinally extends between said first module longitudinal end and said second module longitudinal end;

a first longitudinally extending support element, longitudinally extending between said first module longitudinal end and said second module longitudinal end, the first rail element being mounted to the first longitudinally extending support element;

the second rail element is a rail element as defined herein according to the first aspect of the presently disclosed subject matter, and wherein second rail element longitudinally extends between said first module longitudinal end and said second module longitudinal end;

a second longitudinally extending support element, longitudinally extending between said first module longitudinal end and said second module longitudinal end, the second rail element being mounted to the second longitudinally extending support element;

the strip panel element comprising a flexible sheet material having a first longitudinal edge and a second longitudinal edge, the first longitudinal edge being transversely spaced from the second longitudinal edge by a second transverse spacing, the first longitudinal edge and the second longitudinal edge longitudinally extending between a first longitudinal end of the strip panel element and a second longitudinal end of the strip panel element, the first longitudinal edge is configured for being accommodated within the first lumen of said first rail element to enable free relative longitudinal sliding motion therebetween while preventing transverse separation therebetween, the second longitudinal edge is configured for being accommodated within the second lumen of said second rail element to enable free relative longitudinal sliding motion therebetween while preventing transverse separation therebetween;

the first bobbin having a first bobbin axis and configured for selectively and alternately retracting and deploying the strip panel element with respect to the first rail element and the second rail element for enabling the strip panel element to respectively uncover and cover the zone.

For example:

the first longitudinal edge comprises a first plurality of first sliding elements in spaced relationship along said first longitudinal edge, said first plurality of first sliding elements being configured for being accommodated within the first lumen of said first rail element to enable selective relative longitudinal sliding motion between the strip panel element and the first rail while concurrently preventing transverse separation therebetween; and/or the second longitudinal edge comprises a second plurality of second sliding elements in spaced relationship along said second longitudinal edge, said second plurality of second sliding elements being configured for being accommodated within the second lumen of said second rail element to enable selective relative longitudinal sliding motion between the strip panel element and the second rail while concurrently preventing transverse separation therebetween.

For example, the first sliding elements are injection molded onto the said first longitudinal edge, and wherein the second sliding elements are injection molded onto the said second longitudinal edge.

For example:

each said first sliding elements has a first element transverse cross-section having a first external transverse dimension parallel to said first opening dimension, wherein said first external transverse dimension is less than said first internal transverse dimension and greater than said first opening dimension;

each said second sliding elements has a second element transverse cross-section having a second external transverse dimension parallel to said second opening dimension, wherein said second external transverse dimension is less than said second internal transverse dimension and greater than said second opening dimension.

Additionally or alternatively, for example, the first sliding elements and the second sliding elements are made from or coated with a low friction material.

Additionally or alternatively, for example, at least one of said first longitudinal edge and said second longitudinal edge comprises a respective cord at the edge thereof.

Additionally or alternatively, for example, the flexible sheet material is in the form of an open mesh material. For example, the flexible sheet material is in the form of a net.

Additionally or alternatively, for example, the first bobbin is configured for selectively and alternately retracting and deploying the strip panel element with respect to the first rail element and the second rail element by selectively respectively coiling and uncoiling the strip panel element with respect to the first bobbin. For example, the first bobbin is located at the first module longitudinal end, wherein the first longitudinal end of the strip panel element is fixed to the first bobbin, and wherein the second longitudinal end of the strip panel element comprises a cable element windable about a winding element having a winding axis, wherein the first bobbin is selectively rotatable about the first bobbin axis in a first direction for coiling the strip panel element thereonto, and wherein the cable element windable about the winding axis in a second direction for uncoiling the strip panel element from the first bobbin.

In at least one example, the winding axis is co-axial with the first bobbin axis, and wherein the cable element is looped around a pulley arrangement at the second module longitudinal end between the second longitudinal end of the strip panel element and the winding element. For example, further comprising a first powered drive coupled to the first bobbin and to the winding element, and wherein said first direction is opposed to said second direction.

In at least one other example, the winding element is located at the second module longitudinal end. For example, the system further comprises a first powered drive coupled to the first bobbin and a second powered drive coupled to the winding element.

Additionally or alternatively, for example, the system further comprises:

a first plurality of first vertical support members, affixed to and supporting the first rail element in vertically spaced relationship with respect to the zone, and a second plurality of second vertical support members, affixed to and supporting the second rail element in vertically spaced relationship with respect to the zone.

Additionally or alternatively, for example, the system further comprises at least one pair of adjacent juxtaposed said module, each said pair including a first said module and a second said module, wherein a respective said second rail element of the first module is concurrently the respective said first rail element of the second module.

According to the second aspect of the presently disclosed subject matter there is provided a method for reversibly covering a zone, for example in spaced relationship therewith, for example in vertically spaced relationship therewith, the method comprising:
  providing the system as defined herein according to the second aspect of the presently disclosed subject matter;
  selectively deploying the strip panel element over the ground zone;
  optionally selectively retracting the strip panel element from over the ground zone.

A feature of at least one example of the presently disclosed subject matter is that a rail element is provided that can be retroactively fitted onto an existing longitudinal support cable that is already installed over an area to be covered.

Another feature of at least one example of the presently disclosed subject matter is that a system is provided for covering a zone, the system including a strip panel element that is displaceable with respect to rail members, and that enables the user to selectively mechanically cover the zine with the strip element, and to alternately remove the strip panel element from the zone to uncover zone, in a simple and cost-effective manner.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which.

DETAILED DESCRIPTION

Figure 1:
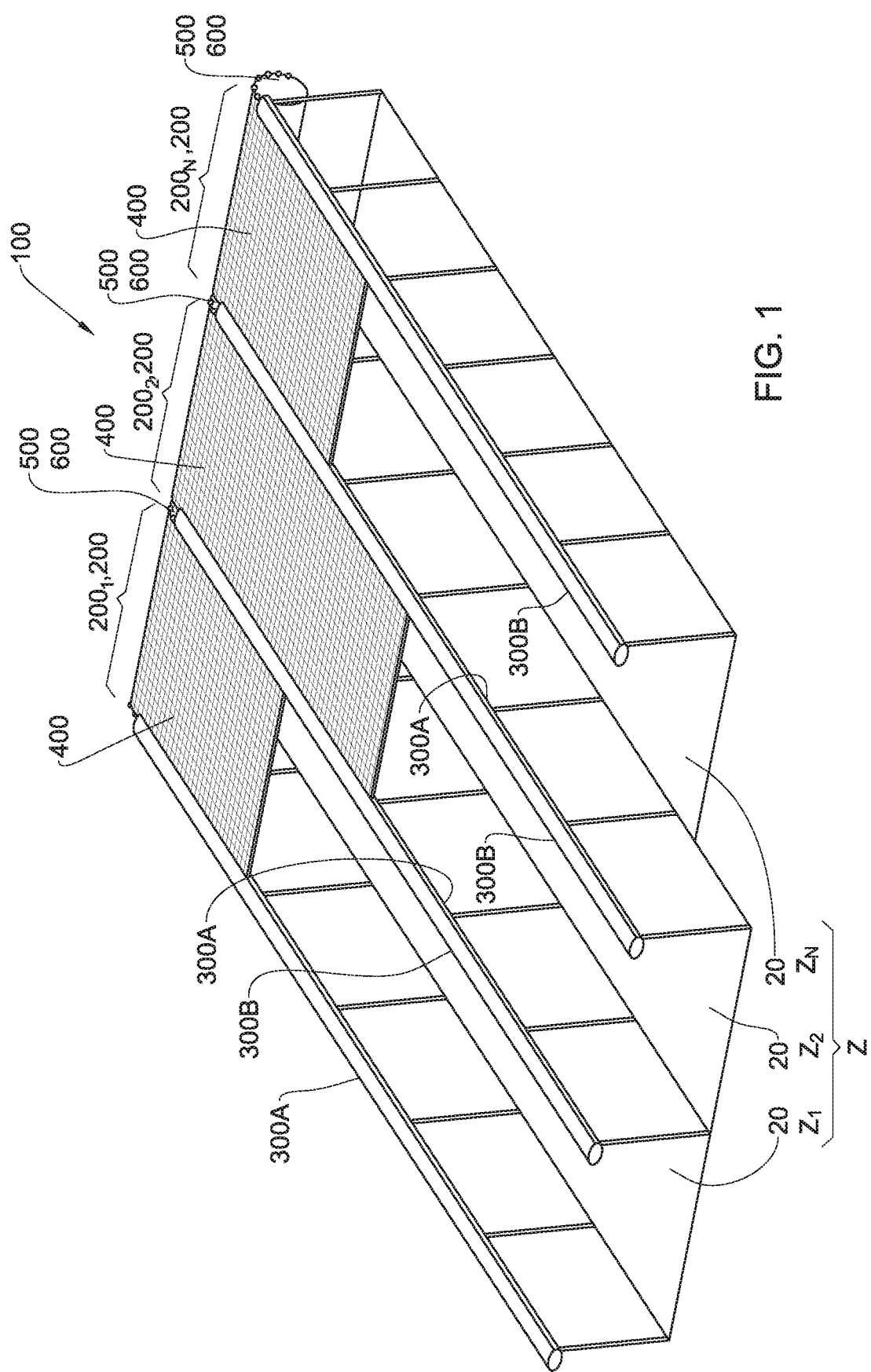
FIG. 1 is an isometric view of an example of a system according to a first aspect of the presently disclosed subject matter.
Figure 2:
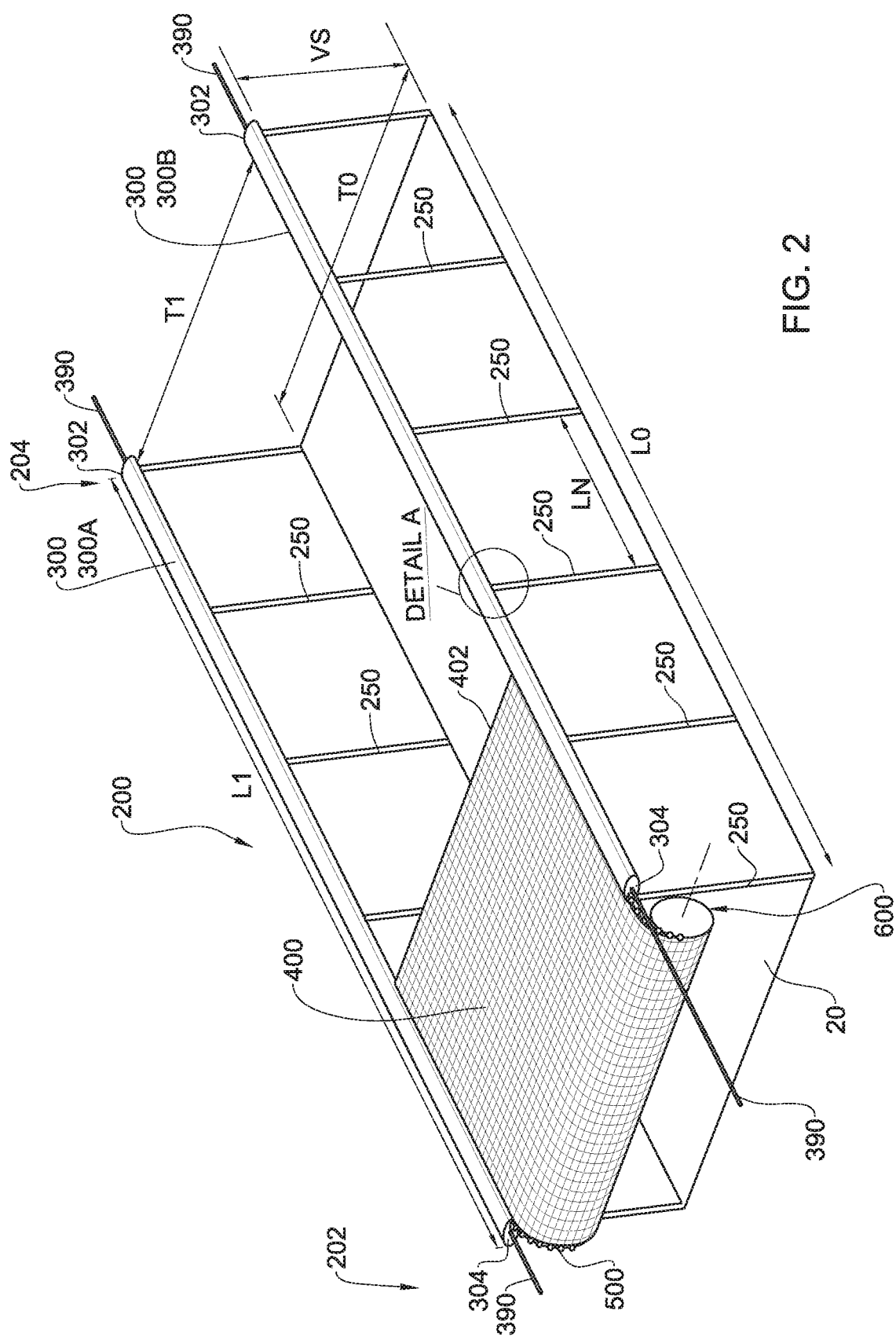
FIG. 2 is an isometric view of a module of the example of FIG. 1.

According to a first aspect of the presently disclosed subject matter, and referring to FIGS. 1 and 2, a system for reversibly covering a zone, according to a first example of the system, generally designated 100, comprises at least one overlying/covering module 200, and typically a plurality of said modules 200. Each overlying/covering module 200 comprises a first rail element 300A, a second rail element 300B, a strip panel element 400, and a deployment system 500 comprising at least a first bobbin 600.

While in this example, the system 100 is configured for reversibly covering a zone in the form of a ground area, in vertical spaced relationship therewith, in particular an agricultural ground area, the presently disclosed subject matter is not limited to such applications, and can be used for covering any suitable zone, particularly in vertical spaced relationship therewith. For example, such alternative applications of the system 100 can include any one of: covering for a body of water such as for example a swimming pool; covering for a tabernacle (known as a "Succah").

In at least this example, the system 100 can be used for covering a zone of any suitable size and shape, wherein the zone Z can be divided into sub-zones $Z_1, Z_2 \ldots Z_n$ (each sub-zone also being individually designated herein by the collective reference "ZO") that can be in juxtaposed relationship with respect to one another. In at least this example, each sub-zone ZO is in the form of a rectangular strip having a respective longitudinal dimension LO and transverse dimension TO, and is reversibly covered by a corresponding module 200 (correspondingly referred to herein also as $200_1$, $200_2 \ldots 200n$, respectively). For example, each zone can be part of a greenhouse, and/or each module 200 can be used for reversibly covering a ground zone with thermal and/or darkened and/or shad screens.

Figure 3:
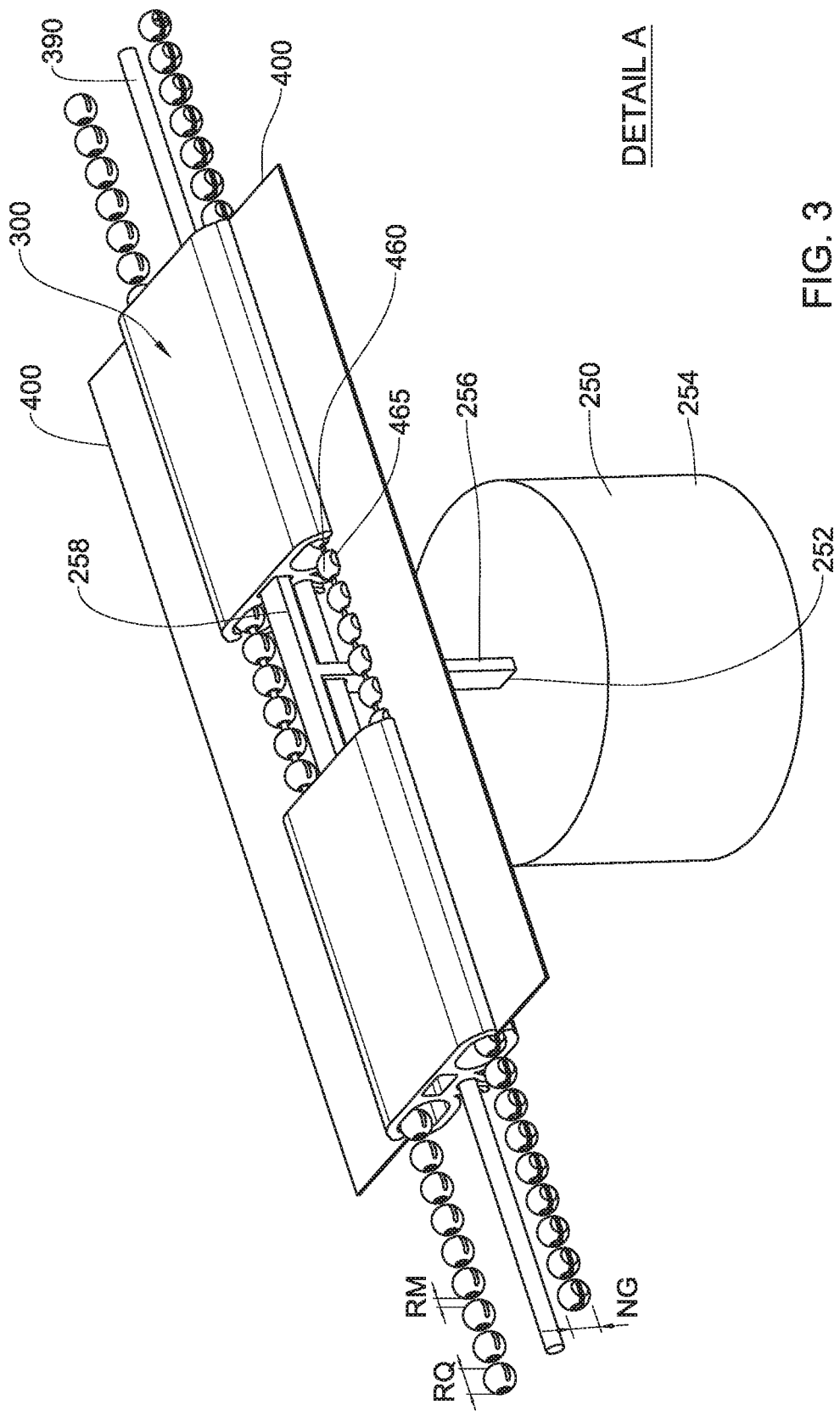
FIG. 3 is an isometric view of the detail A marked in the example of FIG. 2.

Referring to FIGS. 2 and 3, each module 200 is configured for use with a pair of longitudinal support elements 390, each support element 390 being associated with a rail element 300 of the module 200, and a plurality of vertical support members 250 that are configured for spacing the longitudinal support elements 390 in vertical spaced relationship with the respective sub-zone ZO.

Referring again to FIGS. 2 and 3, the first rail element 300A and the second rail element 300B of each respective module 200 co-extend longitudinally along a longitudinal dimension L1, and are laterally spaced from one another by a first transverse spacing T1. The longitudinal dimension L1, and first transverse spacing T1 generally correspond to the longitudinal dimension LO and transverse dimension TO of the respective zone ZO.

In at least this example and in other examples, the first rail element 300A and the second real element 300B are essentially similar or identical to one another, and thus shall also be collectively referred to rail element 300. However, in alternative variations of this example, and in other examples, the first rail element 300A and the second real element 300B can be different from one another.

Figure 4:
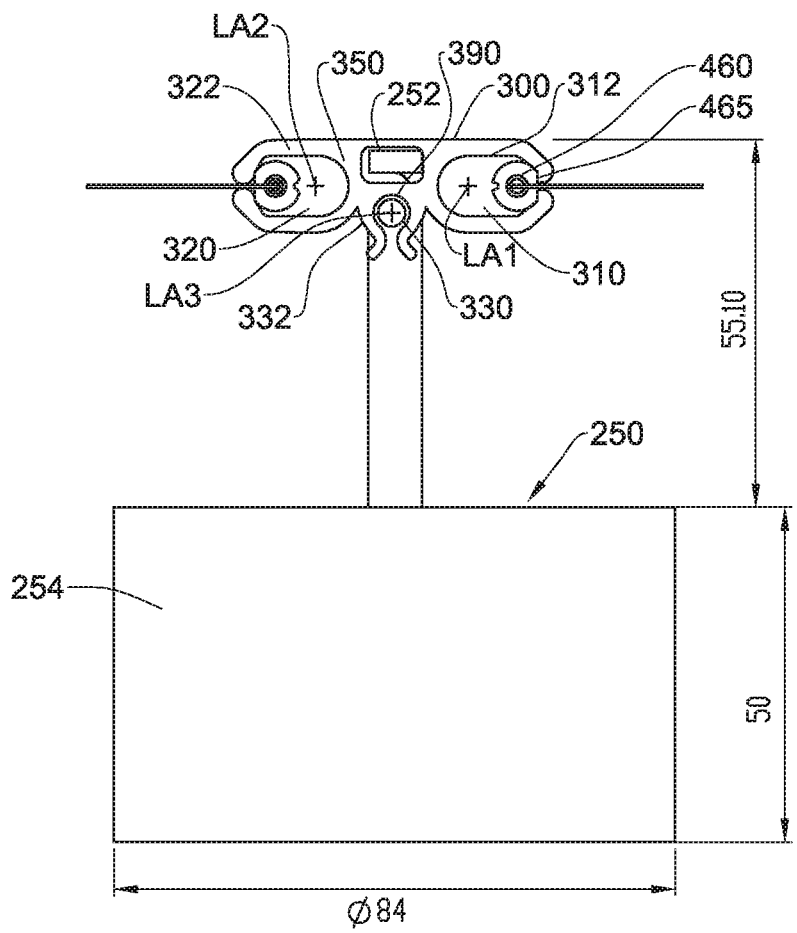
FIG. 4 is a front view of the example of FIG. 3.

The rail elements 300 are each generally elongate, and can be rectilinear or curved, or can include sections which are rectilinear and/or sections which are curved, in any combination. Referring to FIG. 4 in particular, each rail element 300 has a uniform cross section.

Referring again to FIG. 2, in a first example thereof, each rail element 300 comprises a respective first longitudinal end 302 and a second longitudinal end 304, the first longitudinal end 302 being longitudinally spaced from the second longitudinal end 304 by longitudinal dimension L1.

The first longitudinal end 302 corresponds to the first longitudinal end 202 of the module 200, and the second longitudinal end 304 corresponds to the second longitudinal end 204 of the module 200.

Figure 5:
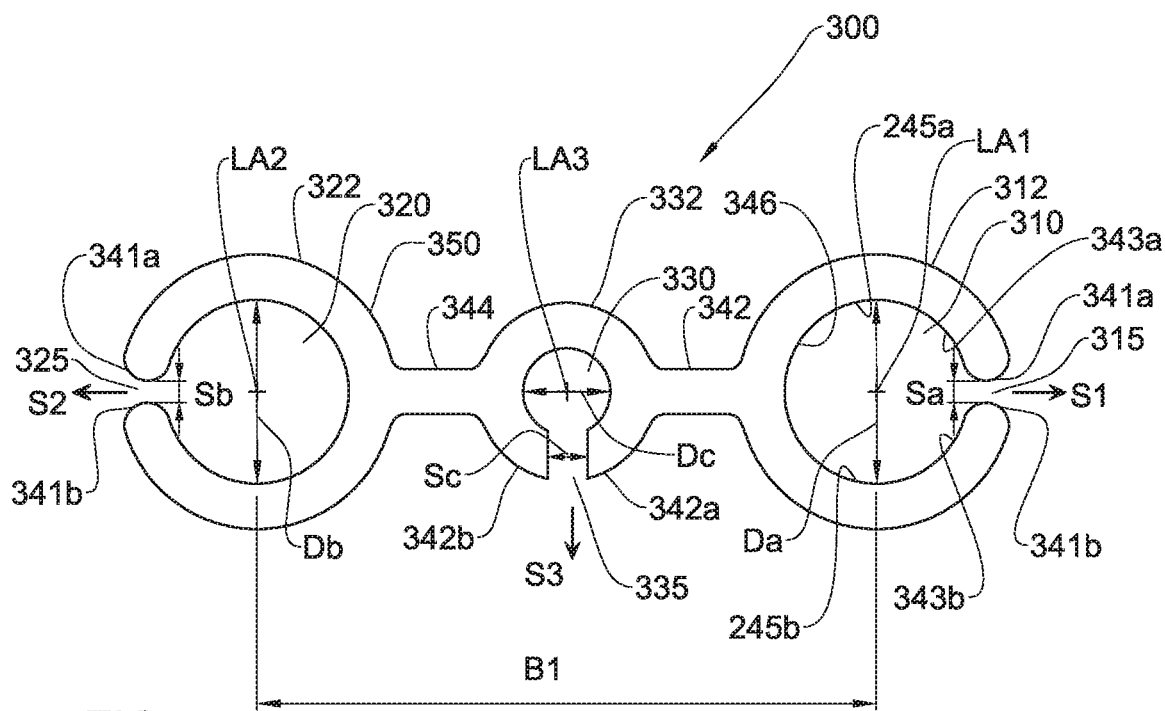
FIG. 5 is a transverse cross-sectional view of a first example of a rail element according to a second aspect of the presently disclosed subject matter.

Referring to FIG. 5, in a first example thereof, each rail element 300 comprises a rail body 350 comprising a first lumen 310 having a longitudinally co-extensive transverse first opening 315 in the form of a longitudinal slit, nominally parallel to first longitudinal axis LA1 of the first lumen 310, the first lumen 310 and transverse first opening 315 longitudinally extending the length L1 of the rail element 300, between the first longitudinal end 302 and the second longitudinal end 304. Each rail element 300 further comprises a second lumen 320 having a longitudinally co-extensive transverse second opening 325 also in the form of a slit, nominally parallel to second longitudinal axis LA2 of the second lumen 320, the second lumen 320 and transverse second opening 325 longitudinally extending along the length of the rail element 300, between the first longitudinal end 302 and the second longitudinal end 304. Thus, in at least this example, each rail element 300 is configured for being used concurrently with two other similar rail elements 300 transversely spaced therefrom in opposite transverse directions, to thereby provide part of two adjacent modules 200.

Each one of the first opening 315 and the second opening 325 has respective facing edges 341a, 341b spaced by spacing Sa, Sb, respectively defining the first opening dimension in a direction orthogonal to the first longitudinal axes LA1, and the second opening dimension in a direction orthogonal to the second longitudinal axes LA2. Shoulders 343a, 343b extend from edges 341a, 341b in opposed directions from the respective first opening 315 or second opening 325, and side walls 345a, 345b join the respective shoulders 343a, 343b to base wall 346.

It is to be noted that the first lumen 310 has a first transverse cross-section having a first internal transverse dimension Da parallel to first opening dimension Sa, the first internal transverse dimension Da being greater than the first opening dimension Sa. Similarly, the second lumen 320 has a second transverse cross-section having a second internal transverse dimension Db parallel to second opening dimension Sb, the second internal transverse dimension Db being greater than the second opening dimension Sb.

In at least this example, and referring again to FIG. 5, the transverse first opening 315 and the transverse second opening 325 are facing, away from their respective longitudinal axes LA1, LA2, in mutually opposite transverse directions S1 and S2 respectively. In this and other examples, transverse directions S1 and S2 are diametrically opposite transverse directions.

Each rail element 300 further comprises, at least in operation of the system 100 and in particular at least in operation of the of the respective module 200, a longitudinal support element 390. The support element 390 longitudinally extends at least between the first longitudinal end 302 and the second longitudinal end 304.

Furthermore, in at least this example, each rail element 300 further comprises a third lumen 330 configured for accommodating the respective support element 390 in load bearing contact, at least in operation of the system 100 and in particular at least in operation of the respective module 200.

According to a second aspect of the presently disclosed subject matter, the third lumen 330 is configured for enabling the respective support element 390 to be reversibly inserted into the respective third lumen 330 in a non-longitudinal manner, i.e., in a non-longitudinal direction, i.e., in a different manner from that of inserting it into the lumen 330 via the first longitudinal end 302 and out from the second longitudinal end 304, or via the second longitudinal end 304 and out from the first longitudinal end 302.

In particular, the rail element 300 is configured for being mounted to the longitudinal support member 390 in a transverse direction for example orthogonal to the longitudinal direction, and enables the rail element 300 to be transversely mounted to an already existing and installed mounting member 390, without the need to dismantle the support member 390 and insert the same between the first longitudinal end 302 and the second longitudinal end 304.

In this example, this is accomplished by providing the third lumen 330 with longitudinally co-extensive third opening 335, as will become clearer below.

In other words, the each support element 390 can be inserted into and optionally removed from the respective third lumen 330, without the need to damage or destroy either the third lumen 330 or the respective support element 390.

In any case, it is to be noted that when the accommodated in the third lumen 330 the support element 390 is in load bearing contact therewith, thereby enabling tensile loads to be transmitted between the third lumen 330 and the respective support element 390.

In at least this example, each of the respective support elements 390 are each in the form of a tensile member, in particular a wire or cable, for example made from a suitable metal (for example steel). The respective support elements 390 (for each module 200), in particular in the form of a tensile member, in particular in the form of a wire or cable, are configured for, and thus have the mechanical properties to, enable supporting the weight of the respective module 200, and (as appropriate) also at least half of the weight of each of the two modules 200 that can also be supported by the system 100 on either transverse side of the respective module 200.

In at least this example, and referring again to FIG. 5, the third lumen 300 comprises longitudinally co-extensive third opening 335, nominally parallel to third longitudinal axis LA3 of the third lumen 330, the third lumen 330 and the third opening 335 longitudinally extending between the first longitudinal end 302 and the second longitudinal end 304. In at least this example, and referring to FIG. 5, the third opening 335 is facing in a direction different from that of the transverse first opening 315 and that of the transverse second opening 325. For example, the third opening 335 is facing in a direction S3 (away from its respective longitudinal axis LA3) orthogonal to direction S1 of the transverse first opening 315 and to direction S2 of the transverse second opening 325.

The third opening 335 has respective facing edges 342a, 342b spaced by spacing Sc defining the third opening dimension in a direction orthogonal to the third longitudinal axes LA3. It is to be noted that the third lumen 330 has a third transverse cross-section having a third internal transverse dimension Dc parallel to third opening dimension Sc, the third internal transverse dimension Dc being greater than the third opening dimension Sc. The third transverse cross-section and the third internal transverse dimension Dc are correlated to the cross-sectional geometry of the longitudinal support element 390, for example to provide a friction fit between the two, to thereby provide load-bearing contact between the third lumen 330 and the longitudinal support element 390

Referring again to FIG. 5, in at least this example each rail body 350 comprises:
  a first tubing 312 having a C-shaped cross-section, in which the inside of the "C" defines the first lumen 310 and the opening of the "C" defines the transverse first opening 315;
  a second tubing 322 having a C-shaped cross-section, in which the inside of the "C" defines the second lumen 320 and the opening of the "C" defines the transverse second opening 325; and
  a third tubing 332 having a C-shaped cross-section, in which the inside of the "C" defines the third lumen 330 and the opening of the "C" defines the third opening 335.

Furthermore, the first tubing 312 is connected to the third tubing 332 (at one transverse side of the third tubing 332) via a first spacer flange 342, and the second tubing 322 is connected to the third tubing 332 (at another transverse side of the third tubing 332) via a second spacer flange 344. While in at least this example, and other examples, the rail element 300 is made as an integral article, in alternative variations of this example, and in other examples, the rail element 300 can instead be made from several components suitable joined together.

In this example, and in transverse view (see FIG. 5), the first longitudinal axis LA1, the second longitudinal axis LA2 and the third longitudinal axis LA3 lie in a straight line. Furthermore, the third longitudinal axis LA3 is equi-spaced in-between the first longitudinal axis LA1 and the second longitudinal axis LA2. The first longitudinal axis LA1 is transversely spaced from the second longitudinal axis LA2 by spacing B1.

In an alternative variation of the example of FIG. 5, the first spacer flange 342 and the second spacer flange 344 are omitted; the first tubing 312 is directly and tangentially connected to the third tubing 332, and the second tubing 322 is directly and tangentially connected to the third tubing 332 diametrically opposite to the first tubing 312.

Figure 5A:
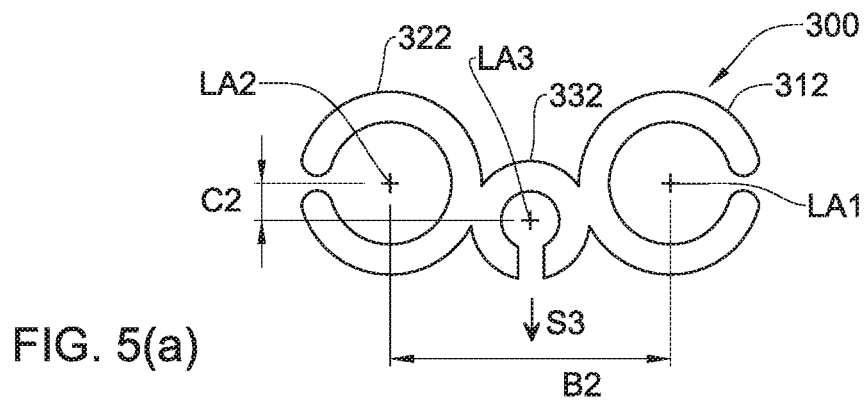
FIG. 5(a) is a transverse cross-sectional view of a variation of the example of FIG. 5.

In yet another alternative variation of the example of FIG. 5, and referring to FIG. 5(a), the first tubing 312 is directly and tangentially connected to the third tubing 332, and the second tubing 322 is directly and tangentially connected to the third tubing 332. However, the first longitudinal axis LA1, the second longitudinal axis LA2 and the third longitudinal axis LA3 do not lie in a straight line. Rather, the third longitudinal axis LA3 is vertically displaced in direction S3 from the first longitudinal axis LA1 and the second longitudinal axis LA2 by spacing C2, while the first longitudinal axis LA1 is transversely spaced from the second longitudinal axis LA2 by spacing B2.

Figure 5B:
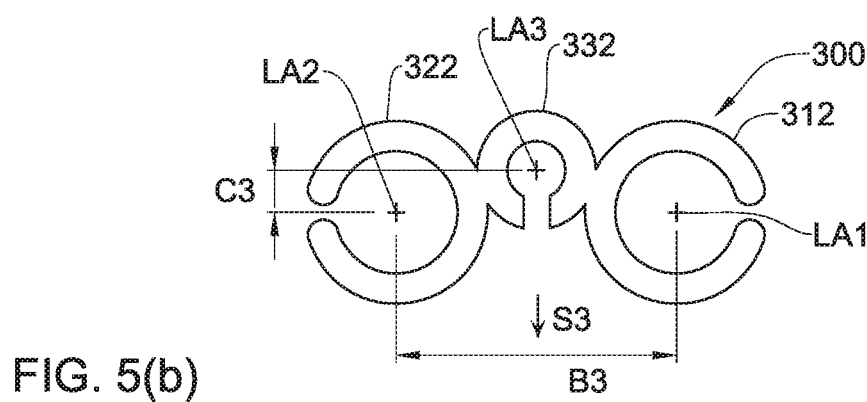
FIG. 5(b) is a transverse cross-sectional view of another variation of the example of FIG. 5.

In yet another alternative variation of the example of FIG. 5, and referring to FIG. 5(b), the first tubing 312 is directly and tangentially connected to the third tubing 332, and the second tubing 322 is directly and tangentially connected to the third tubing 332. However, the first longitudinal axis LA1, the second longitudinal axis LA2 and the third longitudinal axis LA3 do not lie in a straight line. Rather, the third longitudinal axis LA3 is vertically displaced in direction S3 away from the first longitudinal axis LA1 and the second longitudinal axis LA2 by spacing C3, while the first longitudinal axis LA1 is transversely spaced from the second longitudinal axis LA2 by spacing B3.

Figure 5C:
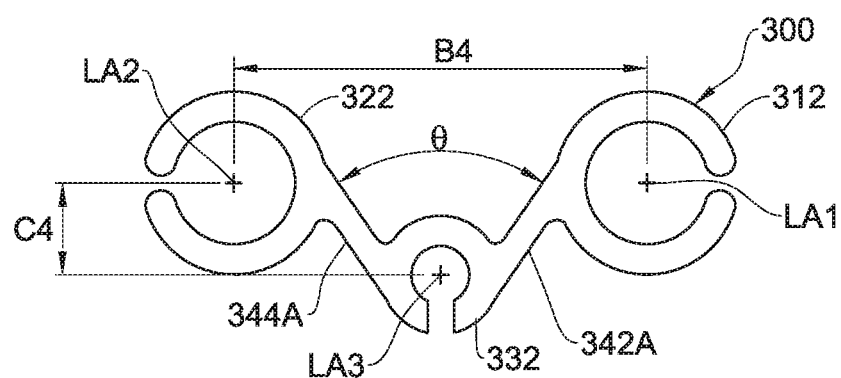
FIG. 5(c) is a transverse cross-sectional view of another variation of the example of FIG. 5.

In yet another alternative variation of the example of FIG. 5, and referring to FIG. 5(c), the first tubing 312 is connected to the third tubing 332 via first spacer flange 342A, and the second tubing 322 is connected to the third tubing 332 via second spacer flange 344A. However, the first longitudinal axis LA1, the second longitudinal axis LA2 and the third longitudinal axis LA3 do not lie in a straight line. Rather, the third longitudinal axis LA3 is vertically displaced in direction S3 from the first longitudinal axis LA1 and the second longitudinal axis LA2 by spacing C4, while the first longitudinal axis LA1 is transversely spaced from the second longitudinal axis LA2 by spacing B4. In this example, the spacer flanges 342A and 344A are rectilinear in transverse cross-section, but in alternative variations of this example, the first spacer flange 342A and/or the second spacer flange 344A can be non-rectilinear, for example curved in transverse cross-section. In this example, the spacer flanges 342A and 344A are angularly displaced by an angle θ, which can be for example about 90°.

Figure 5D:
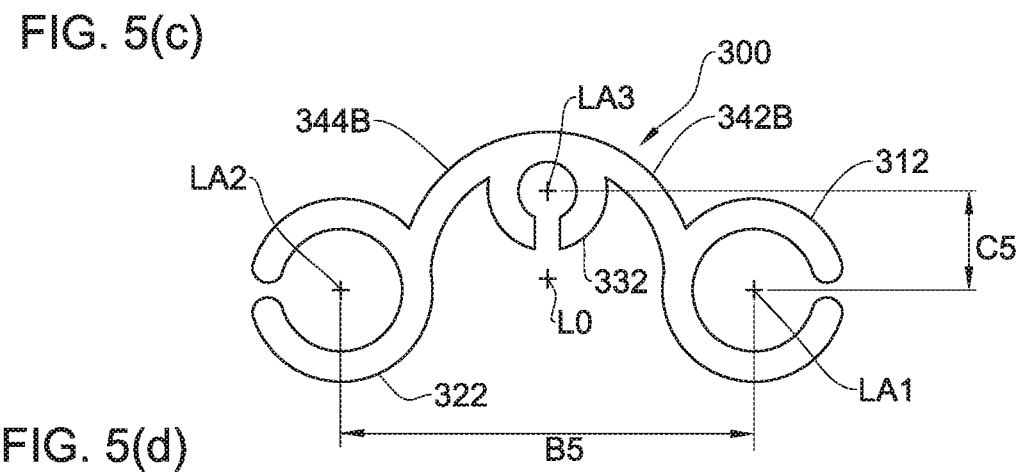
FIG. 5(d) is a transverse cross-sectional view of another variation of the example of FIG. 5.

In yet another alternative variation of the example of FIG. 5, and referring to FIG. 5(d), the first tubing 312 is connected to the third tubing 332 via first spacer flange 342B, and the second tubing 322 is connected to the third tubing 332 via second spacer flange 344B. However, the first longitudinal axis LA1, the second longitudinal axis LA2 and the third longitudinal axis LA3 do not lie in a straight line. Rather, the third longitudinal axis LA3 is vertically displaced in direction S3 away from the first longitudinal axis LA1 and the second longitudinal axis LA2 by spacing C5, while the first longitudinal axis LA1 is transversely spaced from the second longitudinal axis LA2 by spacing B5. In this example, the spacer flanges 342B and 344B are non-rectilinear, for example curved, in transverse cross-section about center CO, but in alternative variations of this example, the first spacer flange 342B and/or the second spacer flange 344B can be rectilinear, for example.

In yet another alternative variation of the example of FIG. 5, and referring to FIG. 4, the first tubing 312 is and the second tubing 322 have a non-circular cross-section, for example generally rectangular but with curved ends, but can instead have an oval, elliptical, or superelliptical cross-section. In the example of FIG. 4, the respective rail body 350 has a generally rectangular cross-section and includes the lumens 310, 320 therein, as well as the third lumen 330. In this example, the third longitudinal axis LA3 is vertically displaced below the first longitudinal axis LA1 and the second longitudinal axis LA2 by spacing, while the first longitudinal axis LA1 is transversely spaced from the second longitudinal axis LA2 by another spacing.

Figure 6:
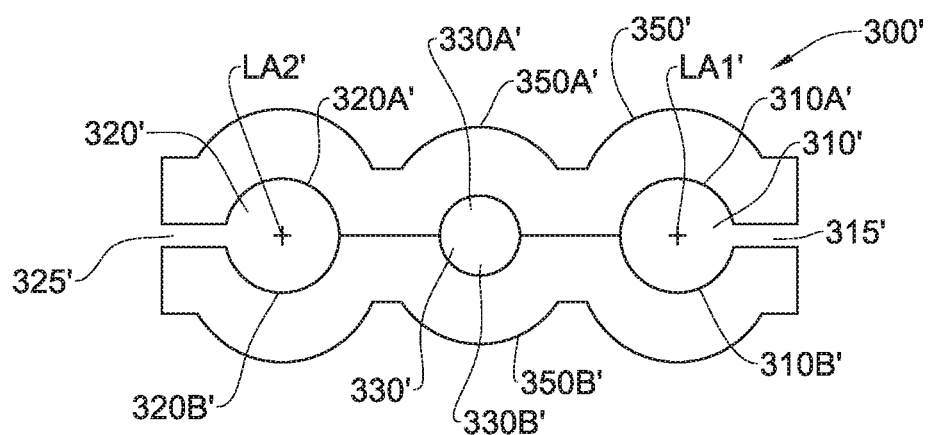
FIG. 6 is a transverse cross-sectional view of a second example of a rail element according to the second aspect of the presently disclosed subject matter

In another example according to the second aspect of the presently disclosed subject matter, and referring to FIG. 6, each rail element, designated with reference numeral 300' comprises the following features: a rail body 350'; a respective first longitudinal end and a second longitudinal end; a first lumen 310' having a longitudinally co-extensive transverse first opening 315' nominally parallel to first longitudinal axis LA1' of the first lumen 310', the first lumen 310' and transverse first opening 315' longitudinally extending between the first longitudinal end and the second longitudinal end of the rail element 300'; a second lumen 320' having a longitudinally co-extensive transverse second opening 325' nominally parallel to second longitudinal axis LA2' of the second lumen 320', the second lumen 320 and transverse second opening 325' longitudinally extending between the first longitudinal end and the second longitudinal end of the rail element 300'. The aforesaid features are similar to, mutatis mutandis (with some differences as will become clearer herein) to the respective features of the rail element 300 according to the first example rail body 350; first longitudinal end 302, the second longitudinal end 304; the first lumen 310, the first opening 315, the first longitudinal axis LA1; the second lumen 320, the transverse second opening 325', the second longitudinal axis LA2'.

Thus, in at least this example, each rail element 300' is configured for being used concurrently with up to two other similar rail elements 300' (or indeed with up to two other rail elements 300) transversely spaced therefrom in opposite transverse directions, in a similar manner to the first example, mutatis mutandis.

Furthermore, and also in a similar manner to the first example mutatis mutandis, each rail element 300' further comprises, at least in operation of the system 100 and in particular at least in operation of the of the respective module 200, a longitudinal support element 390 as disclosed herein for the first example, mutatis mutandis.

As with the first example, mutatis mutandis, the first longitudinal end of the rail element 300' is longitudinally spaced from the second longitudinal end of the rail element 300' by longitudinal dimension L1.

Furthermore, in at least this example, each rail element 300' further comprises a third lumen 330' configured for accommodating the respective longitudinal support element 390 in load bearing contact, at least in operation of the system 100 and in particular at least in operation of the respective module 200.

According to the second aspect of the presently disclosed subject matter, and in a similar manner to the first example, mutatis mutandis, the third lumen 330' is also configured for enabling the rail element 300' to be mounted to the longitudinal support member 390 in a transverse direction for example orthogonal to the longitudinal direction, and enables the rail element 300' to be transversely mounted to an already existing and installed mounting member 390, without the need to dismantle the support member 390 and insert the same between the first longitudinal end 302 and the second longitudinal end 304.

In other words, the each support element 390 can be inserted into and optionally removed from the respective third lumen 330, without the need to damage or destroy either the third lumen 330 or the respective support element 390.

In any case, it is to be noted that when the accommodated in the third lumen 330 the support element 390 is in load bearing contact therewith, thereby enabling tensile loads to be transmitted between the third lumen 330 and the respective support element 390.

Referring again to FIG. 6, in at least this example this is accomplished by providing each rail element 300' in the form of at least two rail body portions that have an open (or disassembled) configuration, and a closed (or assembled) configuration.

Thus, the rail body 350' is made from at least two rail body portions, including at least a first rail portion 350A' and a second rail portion 350B'.

The first rail portion 350A' and the second rail portion 350B' each define therein a respective one of a third lumen first part 330A' and third lumen second part 330B'.

In the assembled configuration shown in FIG. 6, the first rail portion 350A' and the second rail portion 350B' are assembled together, and the third lumen first part 330A' and the third lumen second part 350B' form the third lumen 330'.

In the disassembled configuration, the third lumen first part 330A' is spaced from the third lumen second part 330B' in a non-longitudinal direction, for example laterally or transversally, and this enables the longitudinal support member 390 to be inserted first the third lumen first part 330A' or the third lumen second part 330B' in a non-longitudinal direction/manner Thereafter the third lumen second part 330B' or the third lumen first part 330A', respectively, is affixed to the first the third lumen first part 330A' or the third lumen second part 330B', thereby enclosing therein the longitudinal support member 390.

Thus, first rail portion 350A' and the second rail portion 350B' can be configured for locking with respect to one another in the assembled configuration.

Figure 7:
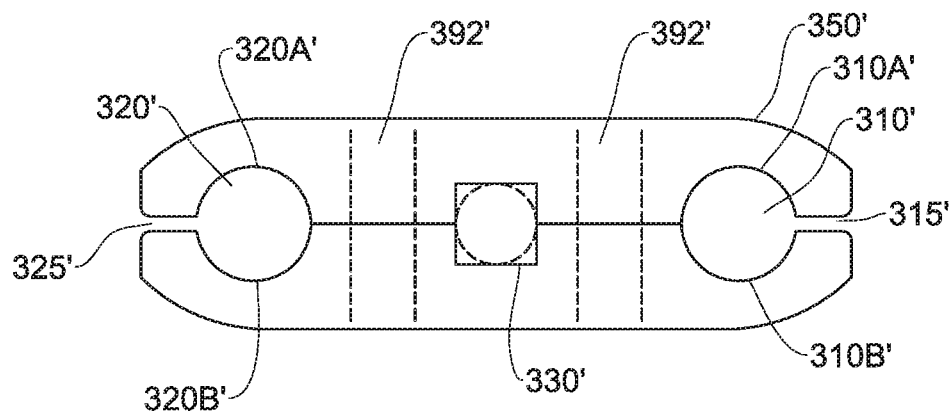
FIG. 7 is a transverse cross-sectional view of a variation of the example of FIG. 6.

For example, referring to FIG. 7, the first rail portion 350A' and the second rail portion 350B' can be locked with respect to one another in the assembled configuration via screws 392', or alternatively using any other suitable mechanical locks, welding, adhesion and so on.

Figure 8:
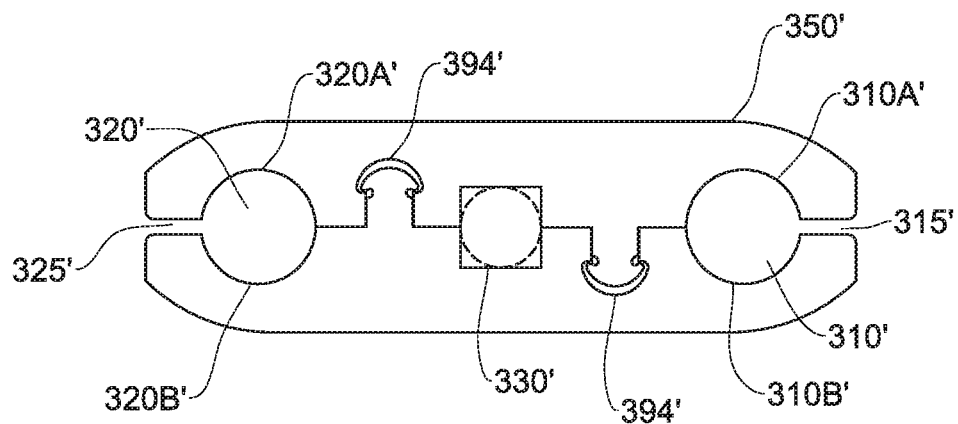
FIG. 8 is a transverse cross-sectional view of another variation of the example of FIG. 6.
Figure 9:
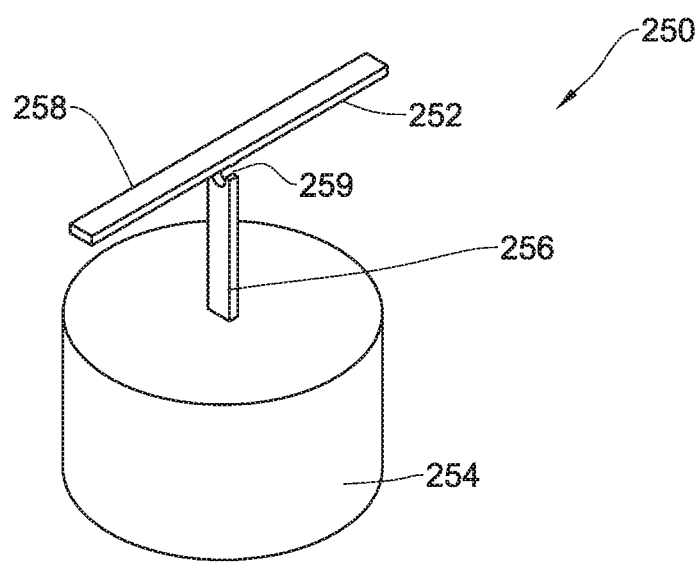
FIG. 9 is an isometric view of an example of a support member according to the first aspect of the presently disclosed subject matter.
Figure 9A:
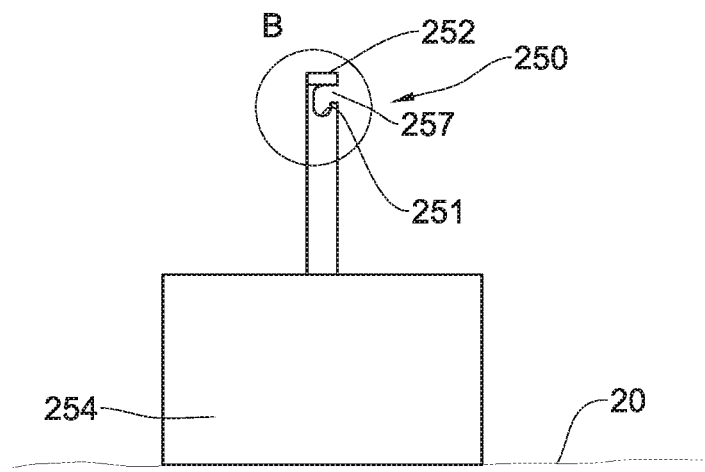
FIG. 9(a) is a front view of the example of FIG. 9.
Figure 9B:
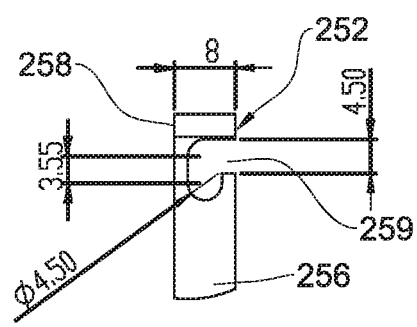
FIG. 9(b) is a front view of the detail A marked in the example of FIG. 9(a).

Alternatively, and referring to FIG. 8, the first rail portion 350A' and the second rail portion 350B' can be locked with respect to one another in the assembled configuration via integral mechanical locking pins 394'.

Referring again to the examples of FIGS. 6, 7, 8, the first rail portion 350A' and the second rail portion 350B' respectively define therein a first lumen first part 310A' and first lumen second part 310B'. In the assembled configuration the first lumen first part 310A' and the first lumen second part 310B' form the first lumen 310', and wherein in the disassembled configuration the first lumen first part 310A' is spaced from the first lumen second part 310B' in a non-longitudinal direction, for example laterally or transversally.

Furthermore, the first rail portion 350A' and the second rail portion 350B' respectively define a second lumen first part 320A' and second lumen second part 320B'. In the assembled configuration the second lumen first part 320A' and the second lumen second part 320B' form the second lumen 320', and in the disassembled configuration the second lumen first part 320A' is spaced from the second lumen second part 320B' in a non-longitudinal direction, for example laterally or transversally.

In alternative variations of the above examples, one or both of the first lumen 310' and the second lumen 320' is fully defined in the first rail portion 350A' or in the second rail portion 350B'.

In alternative variations of this example, the first rail portion 350A' and the second rail portion 350B' are hinged with respect to one another via a hinge arrangement, and the first rail portion 350A' and the second rail portion 350B' are thereby pivotable via the hinge arrangement between the disassembled configuration and the assembled configuration.

Referring again to FIG. 2, the system 100, in particular each module 200 thereof, is configured for being in vertical spaced relationship, via spacing VS, with respect to the zone ZO that it is desired to be reversibly covered by the respective module 200. In this connection, the respective module 200 comprises, in at least the example illustrated in FIGS. 1 to 8, a plurality of vertical support members 250 in load bearing relationship with each of the two rail members 300 of the respective module 200 for supporting the module 200, both statically and dynamically.

In this and other examples, and referring also to FIGS. 2, 3, 4, 9, 9(a) and 9(b), the vertical support members 250 are in located in longitudinal spaced relationship with respect to each rail member 300, each support member 250 having a first end 252 configured for connection to the rail member 300, and a second end 254 anchored on the respective sub zone ZO. In at least this example and in other examples, the vertical support members 250 are configured for supporting the module 200 via the respective rail members 300 in load baring relationship in compression or at least primarily in compression. The vertical support members 250, in particular the respective second ends 254, are in the form of mechanical struts, for example pylons or poles, made for example from wood, metal, concrete or reinforced concrete, or any other suitable materials. Alternatively, each vertical support member 250, in particular the second end 254 thereof, can be in the form of a lattice structure. In any case, the bottom part of the second end 254 can be configured with a suitable base for resting on the ground surface, or with a suitable base for insertion into a suitable hole made therefor in the zone ZO.

In at least this example, the first end 252 is in the form of a "T", having a vertical member 255 connected to a horizontal member 258. The vertical member 255 is affixed to the second end 254. The horizontal member 258 has a uniform cross-section, and is insertable in a complementarily-shaped auxiliary lumen 370 provided in each rail element 300.

For example, and as best seen in FIG. 3, each rail member 300 can be provided in segments, each having a longitudinal length LN (see FIG. 2) corresponding to the spacing between the corresponding two adjacent superior members 250, and the segment can thus be coupled to the two support members 250 by inserting a corresponding half of the respective horizontal members 258 of the two support members 250 at each longitudinal end of the segment.

The support members 250 are further configured for supporting the longitudinal support members 390. In this example, this is accomplished by providing a niche 259 in the vertical member 256, having a side opening 257 and an abutment portion 251 in which the longitudinal support members 390 abuts and rests on during operation of the system 100.

In alternative variations of this example and in other examples, each rail member 300 can be provided in much longer segments, each having a longitudinal length corresponding to the full longitudinal length LN, or to part thereof, but such a longitudinal length being greater than the spacing between two adjacent support members 250. In such an example, the segment of the rail member 300 can be coupled to two or more serially adjacent support members 250 by first providing a cut-out portion in the rail member 300 at the expected location of each support member 250. Each such cut-out portion is provided at the underside of the rail member 300 and extends vertically through the respective third lumen and into the auxiliary lumen 370. This allows the respective horizontal member 258 to be vertically inserted into the auxiliary lumen 370 via the respective cut-out portion. In such cases, the longitudinal support members 390 can be displaced sideways with respect to the respective vertical member 255.

In alternative variations of this example and in other examples, each rail member 300 can also be provided in such longer segments, each having a longitudinal length corresponding to the full longitudinal length LN, or to part thereof, but such a longitudinal length being greater than the spacing between two adjacent support members 250. However, in this example, the segment of the rail member 300 can be coupled to two or more serially adjacent support members 250 by sitting (for example abutting and/or affixing) the rail member 300 onto each support member 250. For example, each horizontal member 258 can be affixed to the underside of the rail member 300 and allows the respective horizontal member 258 to vertically support the rail member 300. In such cases, the longitudinal support members 390 are also supported by the respective horizontal members 258.

Referring again to FIG. 3, each strip panel element 400 is configured for mounting the strip panel element 400 with respect to two transversely spaced rail members 300 and for enabling reversible relative longitudinal movement between the strip panel element 400 and the rail members 300. Herein "strip panel element", "strip element", "sheet element", "panel" and "panel element" are used interchangeably.

Figure 10:
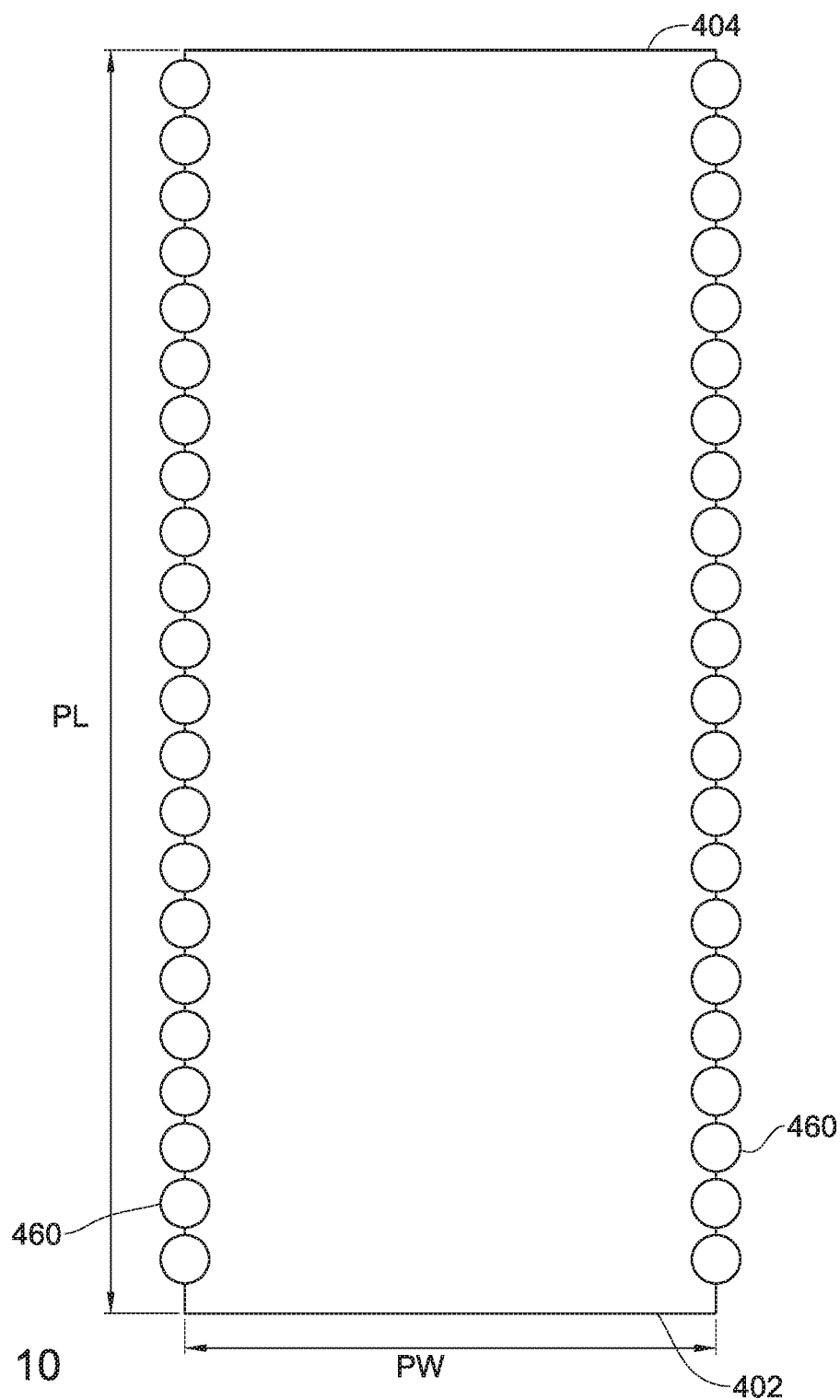
FIG. 10 is a plan view of an example of a panel member according to the first aspect of the presently disclosed subject matter.
Figure 11:
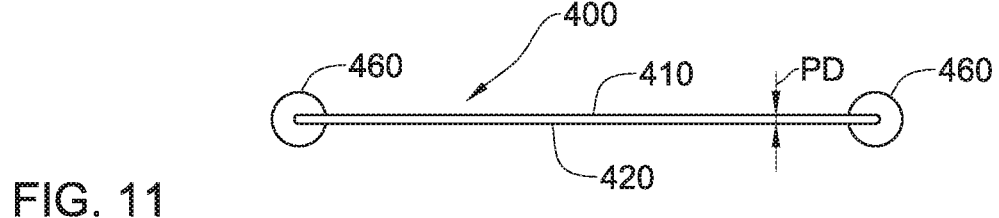
FIG. 11 is a transverse cross-sectional view of the example of FIG. 10.

Referring to FIGS. 10 and 11, the strip panel element 400 has an upper face 410 and a lower face 420, separated from one another by the thickness or depth dimension PD of the strip panel element 400.

In at least some examples, the strip panel element 400 is made from a flexible sheet material, for example fabric, plastic, canvas, Kevlar, and so on, optionally capable of being rolled into a compact spiral configuration, for example with respect to a roll axis in the width direction, and for being unrolled into at least a nominally flat configuration. In at least some examples, the strip panel element 400 is made from a flexible material that is not elastically stretchable, at least when subjected to regular loads, tensile or compressive, i.e., the loads for which the strip panel element 400 is rated during regular use thereof. While the strip panel element 400 can have any suitable shape, in at least this example the strip panel element 400 has a rectangular shape, having a longitudinal dimension PL that is significantly larger than the width dimension PW, both of which are significantly greater than the thickness or depth dimension PD.

The strip panel element 400 has a first longitudinal end 402 and a second longitudinal end 404, spaced from the first longitudinal end 402 by longitudinal dimension PL.

In some examples the strip panel element 400 is formed as a contiguous material, i.e., devoid of pores, holes or any other openings that span the thickness or depth dimension PD and thus would otherwise provide fluid communication between the upper face 410 and a lower face 420. For example, the strip panel element 400 is made from any one of a transparent material, a translucent material or an opaque material. For example such a material can be water resistant. For example, each strip panel element 400 can be configured for covering each zone for thermal and/or sunlight protection, and can be in the form of thermal and/or darkened and/or shade screens.

In other examples, the strip panel element 400 is made from an open mesh material, for example in the form of a net, having a grid structure formed by two pluralities of string elements in mutually orthogonal relationship and defining net openings in the grid. For example, such a net can be provided having net openings large enough to allow for ventilation through the net while preventing insects and/or birds exceeding a certain size (correlated to the size of the net openings) from traversing the net openings.

Figure 12:
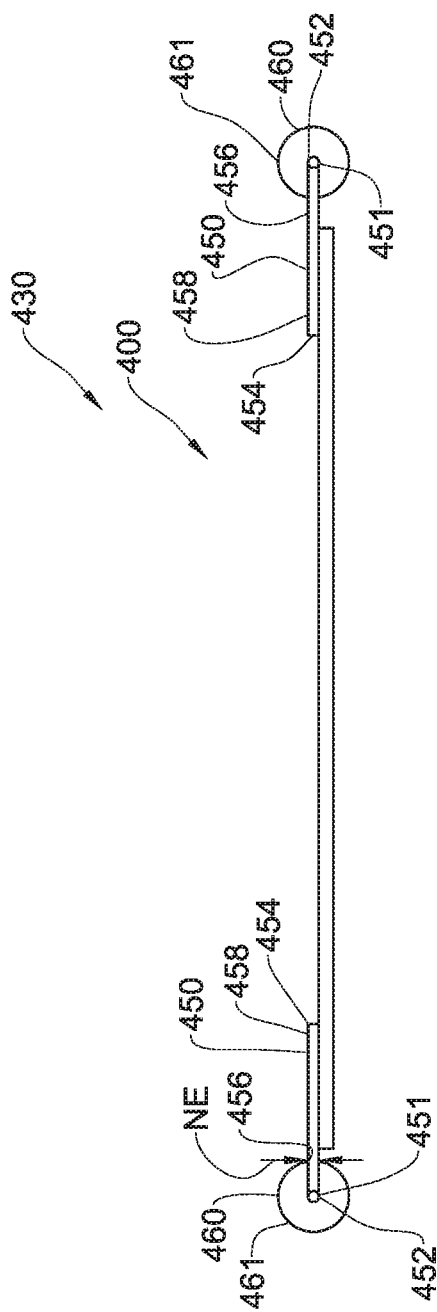
FIG. 12 is a transverse cross-sectional view of a variation of the example of FIG. 11.

In this example, and referring also to FIG. 12, the strip panel element 400 comprises an elongate mounting tape 450 co-extensive with and affixed to each longitudinal side of the strip panel element 400 to form a panel assembly 430. In particular, each mounting tape 450 comprises an outer longitudinal edge portion 456 including outer longitudinal edge 452, and an inner longitudinal edge portion 458 including inner longitudinal edge 454. While in this example the outer edge 452 comprises a cord 451, in alternative variations of this example the cord 451 can be omitted. The cord 451 is configured for reinforcing the outer longitudinal edge portion 456, in particular the outer longitudinal edge 452, and in this example is in the form of a thread element, having a diameter thicker than the thickness of the tape 450.

The outer longitudinal edge 452 is spaced from the inner longitudinal edge 454 by a width spacing.

The mounting tape 450 can be affixed to the strip panel element 400 by being formed integrally therewith, or alternatively by being fixed thereto using any suitable fixing method, for example via mechanical fixing (for example staples, stitching, sewing, etc.), or welding (for example ultrasonic welding, heat welding, etc), or via bonding (for example using suitable adhesives). In this example, the mounting tape 450 is affixed to the strip panel element 400 via widthwise overlap between respective portions of the strip panel element 400 and of the mounting tape 450 that include the longitudinal edges of the panel element 400 and the inner longitudinal edges 454. In alternative variations of this example, the mounting tape 450 is affixed to the panel 400 via edge-to-edge contact between the longitudinal edges of the panel element 400 and the inner longitudinal edges 454.

Each mounting tape 450 comprises a plurality of rail-engaging elements 460 affixed to the outer longitudinal edge 454, in longitudinal spaced relationship. Each rail-engaging element 460 is formed as an integral article and comprises a respective engagement portion 465 configured for being received in the first lumen 310 or the second lumen 320, as best seen in FIGS. 3 and 4.

In at least this example, each rail-engaging element 460 is formed at or near the outer longitudinal outer edge 454, and is formed as a bead. In alternative variations of this example, each rail-engaging element 460 is formed as a spherical, ellipsoid, or other suitable shape.

In any case, and referring to FIGS. 3, 5 and 12, each engagement portion 465 has a maximum cross-sectional dimension NG greater than the spacing Sa or Sb, but sufficiently small to be accommodated in the in the first lumen 310 or the second lumen 320, i.e., dimension NG is less than the spacing Da or Db. On the other hand, the mounting tape 450, particularly in the vicinity of the engagement portion 465, has a thickness dimension NE smaller than spacing Sa or Sb. Each engagement portion 465 further comprises contact surfaces 461 which are configured to facilitate sliding of the each rail-engaging element 460 within the respective first lumen 310 or second lumen 320. In this example, the contact surfaces 461 are in abutting contact with the inside walls that define the first lumen 310 or the second lumen 320 when the rail-engaging elements 460 are mounted to the respective rail member 300.

The rail-engaging elements 460 affixed to the outer longitudinal edge 454 in longitudinal spaced relationship in which adjacent engagement portion 465 are longitudinally spaced from one another by a longitudinal spacing RM (see FIG. 3). In this example the longitudinal spacing RM is less than the longitudinal dimension RQ of the engagement portion 465. For example, the ratio RM:RQ can be any desired number from about 0.1 to about 0.9, for example any one of 0.1, 0.2, 0.3, 0.4, 0.5, 0.6, 0.7, 0.8, 0.9. However, in alternative variations of this example and in other examples, the longitudinal spacing RM is the same or greater than the longitudinal dimension RQ of the engagement portion 465.

In at least this example, the rail-engaging elements 460 are injection-molded directly onto the mounting tape 450, and are made from a material suitable for this purpose, for example thermoplastics materials, including any one of the following materials, for example: POM (Polyoxymethylene), PBT (Polybutylene terephthalate), PA (Polyamide), and so on. In particular, and referring to FIG. 12, the mounting tape 450 can be formed with at least one through-hole 459 formed at the location of, and superposed by, each respective engagement portion 465. Thus, as each rail-engaging element 460 is injection-molded onto the mounting tape 450, integrally straddling the outer edge 454 and cord 451, and the respective engagement portion 465 includes an integral material connection via the through-hole 459.

As best seen in FIG. 4, the cross-sectional area of the engagement portion 465 is a proportion N of the cross-sectional area of the first lumen 310 or of the second lumen 320, wherein N is sufficient to facilitate free relative sliding movement between the engagement portion 465 and the respective first lumen 310 or second lumen 320, even when there is a moderate level of extraneous particles, such as dirt, grit, snow, mud, sand, etc. within the respective first lumen 310 or second lumen 320 or part thereof.

For example, proportion N can be up to about 80% of the cross-sectional area of the first lumen 310 or of the second lumen 320. For example, proportion N can be any one or more of the following percentages of the cross-sectional area of the first lumen 310 or of the second lumen 320: 20% to 30%; 30% to 40%; 40% to 50%; 50% to 60%; 60% to 70%; 70% to 80%.

In this example the engagement portion 465 is also configured for minimizing friction between the engagement portion 465 and the respective rail member 300. Thus there is little or no contact between the majority of the engagement portion 465 and the inner walls of the respective lumen of the rail member 300. Furthermore, the rail-engaging elements 460, or at least engagement portion 465, can be made from an injection-molded material that also has a low coefficient of friction. Such a material can include, for example, Molibden, Teflon, and so on. Optionally, the outside surfaces of the engagement portion 465 and/or the inner walls of the rail members 300 can be coated with a low friction material, for example Teflon, chrome, and so on.

In at least this example, and in other examples, the tape 450 is made from a spun material, for example a textile or other fabric, having a plurality of spun fibers, which can be woven together or alternatively held together in a non-woven fashion. In any case, during the injection-molding process, the injected material is embedded within and/or between the spun fibers, further enhancing the anchoring of the engagement portion 465 with respect to the tape 450.

For example, the mounting tape 450 is made from any one of the following materials: PP (Polypropylene), PA (Polyamide), PVC (Polyvinyl chloride), PES (Polyester) and so on.

Figure 13:
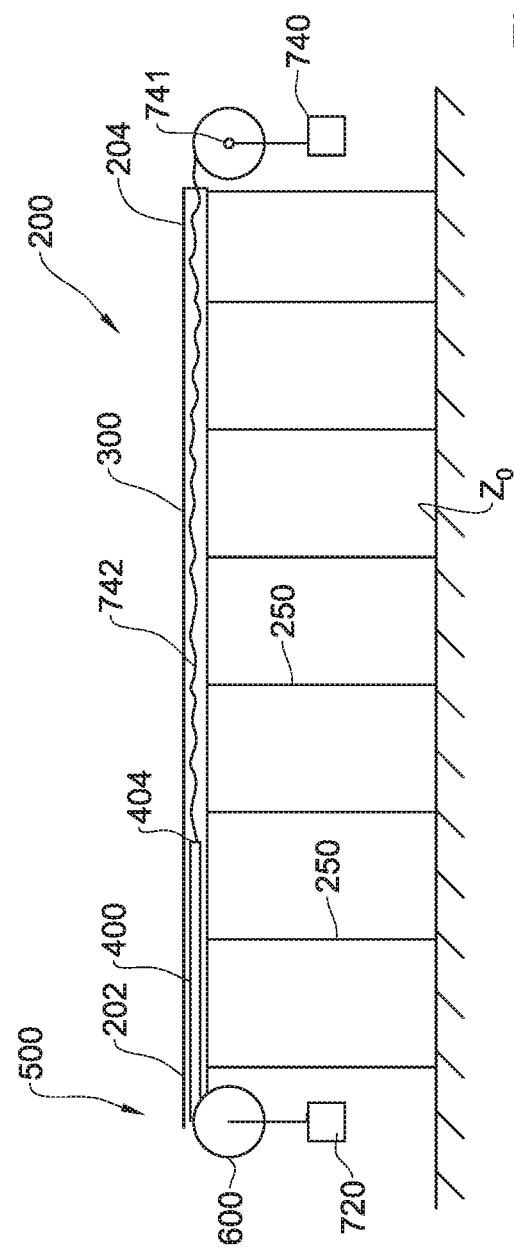
FIG. 13 is a side view of the example of FIG. 2.

Referring to FIGS. 2 and 13, in this example, the module 200 comprises a deployment system 500 comprising a first bobbin 600, a first drive unit 720 for enabling retraction and a second drive unit 720 for enabling deployment.

The first bobbin 600 is provided at the first longitudinal end 202 of the module 200, and has a rolling axis RA about which the strip panel element 400, including an elongate mounting tape 450 affixed to each longitudinal side of the strip panel element 400, is initially rolled in spiral relationship therewith.

In operation of the module 200, the first longitudinal end 202 of the module 200 is coupled with the first longitudinal end 302 of each of the rail elements 300A, 300B, and thus one or more of the engagement portion 465 on one longitudinal edge of the respective strip element 400 is accommodated in the respective first lumen 310 of rail element 300A, and one or more of the engagement portion 465 on the other longitudinal edge of the respective strip element 400 is accommodated in the respective second lumen 320 of rail element 300B.

The second drive unit 740 is provided at the second longitudinal end 204 of the module 200, and is operatively connected to a second longitudinal end 404 of the strip panel element 400. For example, the second drive unit 740 comprises a winding axle 741, and a cable 742 has a first longitudinal cable end thereof fixed to the axle 741, and a second longitudinal cable end fixed to the second longitudinal end 404 of the strip panel element 400. As the axle 741 is turned in one direction, the cable is wound around the axle 741 and thereby draws the second longitudinal end 404 of the strip panel element 400 towards the second longitudinal end 204 of the module 200, thereby deploying the strip panel element 400 and covering the respective sub-zone ZO. Concurrently, the strip panel element 400 is unwound from the respective first bobbin 600.

The second drive unit 740 can be a powered unit, for example comprising one or more electric motors and/or other powered motors mechanically coupled to axle 741 for turning the axle 741 in the aforesaid first direction to deploy the strip panel element 400. Alternatively, second drive unit 740 can be a non-powered unit, for example comprising a handle for turning the axle 741 in the aforesaid first direction to deploy the strip panel element 400.

The first drive unit 720 is provided at the first longitudinal end 202 of the module 200, and is operatively connected to a second longitudinal end 404 of the strip panel element 400, via the first bobbin 600. For example, strip panel element 400 is initially wound about the bobbin 600, and the first longitudinal end 402 of the strip panel element 400 is fixed to the bobbin 600 directly, or indirectly via a cable (not shown). As the first bobbin 600 is turned in one direction, the strip panel element 400 is wound around the bobbin 600 and thereby draws the second longitudinal end 404 of the strip panel element 400 back towards the first longitudinal end 202 of the module 200, thereby retracting the strip panel element 400 and uncovering the respective sub-zone ZO.

The first drive unit 720 can be a powered unit, for example comprising one or more electric motors and/or other powered motors mechanically coupled to bobbin 600 for turning the bobbin 600 in the aforesaid first direction to deploy the strip panel element 400. Alternatively, first drive unit 720 can be a non-powered unit, for example comprising a handle for turning the bobbin 600 in the aforesaid first direction to retract the strip panel element 400.

Figure 14:
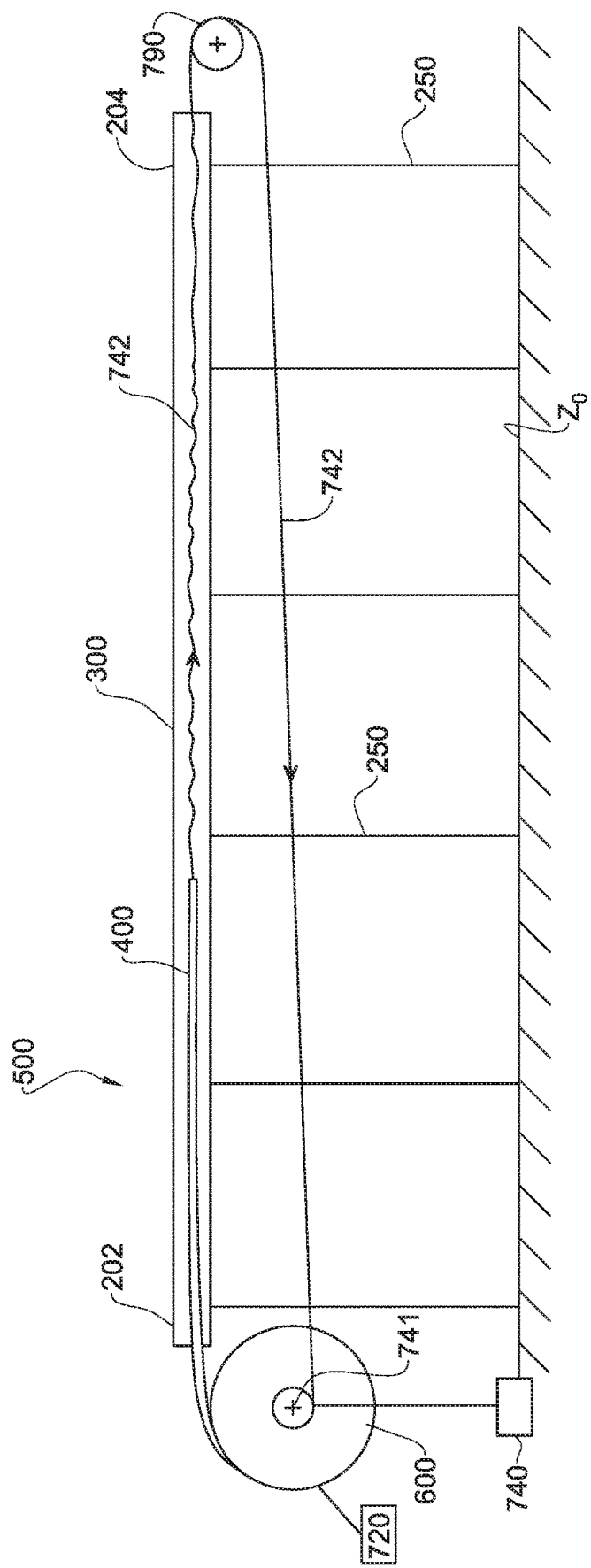
FIG. 14 is a side view of an alternative variation of the example of FIG. 2.

The bobbin 600 and axle 741 can each have a clutch mechanism, for example, such that when the first drive unit 720 is operating, the second drive unit 740 is disengaged and thus does not provide additional load, and such that when the second drive unit 740 is operating, the first drive unit 720 is disengaged and thus does not provide additional load In an alternative variation of the above example, and referring to FIG. 14, the second drive unit 740 is provided at the first longitudinal end 202 of the module 200, and is operatively connected to a second longitudinal end 404 of the strip panel element 400 via a pulley arrangement 790 provided at the second longitudinal end 204 of the module 200.

For example, the winding axle 741 and the bobbin 600 can be co-axial and joined to one another, such that turning the winding axle 741/bobbin 600 in one direction deploys the strip panel element 400 towards the second end 204, while turning the winding axle 741/bobbin 600 in the other direction retracts the strip panel element 400 towards the first end 202.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the scope of the presently disclosed subject matter as set out in the claims.

The invention claimed is:

1. System for reversibly covering a zone, the system comprising at least one overlying module, each overlying module including a first rail element, a second rail element, a strip panel element, and a first bobbin, the overlying module having a first module longitudinal end and a second module longitudinal end, wherein:

a) the first rail element has a respective longitudinal axis, a respective first longitudinal end and a respective second longitudinal end longitudinally spaced from the respective first end along the respective longitudinal axis, the first rail element comprising a first rail body longitudinally extending between the respective said first longitudinal end and the respective said second longitudinal end, said first rail body defining therein at least one respective longitudinally extending first lumen having a respective longitudinally co-extensive transverse first opening, the first rail element being configured for being mounted to at least one first longitudinal support member in load bearing contact therewith in operation of the first rail element, wherein said first rail element is configured for being mounted to the at least one said first longitudinal support member in a non-longitudinal manner, and wherein first rail element longitudinally extends between said first module longitudinal end and said second module longitudinal end;

b) a first longitudinally extending support element, longitudinally extending between said first module longitudinal end and said second module longitudinal end, the first rail element being mounted to the first longitudinally extending support element;

c) the second rail element has a respective longitudinal axis, a respective first longitudinal end and a respective second longitudinal end longitudinally spaced from the respective first end along the respective longitudinal axis, the second rail element comprising a second rail body longitudinally extending between the respective said first longitudinal end and the respective said second longitudinal end, said second rail body defining therein at least one respective longitudinally extending second lumen having a respective longitudinally co-extensive transverse second opening, the second rail element being configured for being mounted to at least one second longitudinal support member in load bearing contact therewith in operation of the second rail element, wherein said second rail element is configured for being mounted to the at least one said second longitudinal support member in a non-longitudinal manner, and wherein second rail element longitudinally extends between said first module longitudinal end and said second module longitudinal end;

d) a second longitudinally extending support element, longitudinally extending between said first module longitudinal end and said second module longitudinal end, the second rail element being mounted to the second longitudinally extending support element;
e) the strip panel element comprising a flexible sheet material having a first longitudinal edge and a second longitudinal edge, the first longitudinal edge being transversely spaced from the second longitudinal edge by a second transverse spacing, the first longitudinal edge and the second longitudinal edge longitudinally extending between a first longitudinal end of the strip panel element and a second longitudinal end of the strip panel element, the first longitudinal edge is configured for being accommodated within the first lumen of said first rail element to enable free relative longitudinal sliding motion therebetween while preventing transverse separation therebetween, the second longitudinal edge is configured for being accommodated within the second lumen of said second rail element to enable free relative longitudinal sliding motion therebetween while preventing transverse separation therebetween;
f) the first bobbin having a first bobbin axis and configured for selectively and alternately retracting and deploying the strip panel element with respect to the first rail element and the second rail element for enabling the strip panel element to respectively uncover and cover the zone;
g) the first longitudinal edge comprises a first plurality of first sliding elements in spaced relationship along said first longitudinal edge, said first plurality of first sliding elements being configured for being accommodated within the first lumen of said first rail element to enable selective relative longitudinal sliding motion between the strip panel element and the first rail while concurrently preventing transverse separation therebetween; and
h) the second longitudinal edge comprises a second plurality of second sliding elements in spaced relationship along said second longitudinal edge, said second plurality of second sliding elements being configured for being accommodated within the second lumen of said second rail element to enable selective relative longitudinal sliding motion between the strip panel element and the second rail while concurrently preventing transverse separation therebetween.

2. The system according to claim 1, wherein said transverse first opening has a first opening dimension, orthogonal to the longitudinal axis, and wherein said at least one first lumen has a first transverse cross-section having a first internal transverse dimension parallel to said first opening dimension, wherein said first internal transverse dimension is greater than said first opening dimension.

3. The system according to claim 1, wherein said first transverse cross-section is any one of: circular, oval, rectangular, elliptical, superelliptical.

4. The system according to claim 1, including one of a), b), c), or d):
a) at least one of said first rail body and said second rail body defining therein at least one respective longitudinally extending additional lumen having a respective longitudinally co-extensive transverse additional opening, wherein said at least one longitudinally extending additional lumen is transversely spaced with respect to the respective said at least one longitudinally extending first lumen or said at least one longitudinally extending second lumen;
b) at least one of said first rail body and said second rail body defining therein at least one respective longitudinally extending additional lumen having a respective longitudinally co-extensive transverse additional opening, wherein said at least one longitudinally extending additional lumen is transversely spaced with respect to the respective said at least one longitudinally extending first lumen or said at least one longitudinally extending second lumen, and, wherein said transverse additional opening has an additional opening dimension, orthogonal to the respective longitudinal axis, and wherein the respective said at least one additional lumen has a respective additional transverse cross-section having a respective internal transverse dimension parallel to said additional opening dimension, wherein said respective internal transverse dimension is greater than said additional opening dimension;
c) at least one of said first rail body and said second rail body defining therein at least one respective longitudinally extending additional lumen having a respective longitudinally co-extensive transverse additional opening, wherein said at least one longitudinally extending additional lumen is transversely spaced with respect to the respective said at least one longitudinally extending first lumen or said at least one longitudinally extending second lumen, and, wherein said additional transverse cross-section is any one of: circular, oval, rectangular, elliptical, superelliptical; or
d) at least one of said first rail body and said second rail body defining therein at least one respective longitudinally extending additional lumen having a respective longitudinally co-extensive transverse additional opening, wherein said at least one longitudinally extending additional lumen is transversely spaced with respect to the respective said at least one longitudinally extending first lumen or said at least one longitudinally extending second lumen, and, wherein said transverse additional opening has an additional opening dimension, orthogonal to the respective longitudinal axis, and wherein the respective said at least one additional lumen has a respective additional transverse cross-section having a respective internal transverse dimension parallel to said additional opening dimension, wherein said respective internal transverse dimension is greater than said additional opening dimension, and, wherein said additional transverse cross-section is any one of: circular, oval, rectangular, elliptical, superelliptical.

5. The system according to claim 1, at least one of said first rail body and said second rail body defining therein at least one longitudinally extending respective third lumen configured for being in load-bearing relationship with respect to a respective at least one said first longitudinal support member or said second longitudinal support member at least in operation of the rail element.

6. The system according to claim 5, including one of a), b), c), or d):
a) wherein said respective at least one third lumen comprises a respective longitudinally co-extensive lateral third opening, wherein said respective at least one longitudinally extending third lumen is transversely spaced at least with respect to said respective at least one longitudinally extending first lumen;
b) wherein said respective at least one third lumen comprises a respective longitudinally co-extensive lateral third opening, wherein said respective at least one longitudinally extending third lumen is transversely spaced at least with respect to said respective at least one longitudinally extending first lumen, and, wherein said respective transverse third opening has a respective third opening dimension, orthogonal to the respective longitudinal axis, and wherein said respective at least one third lumen has a respective third transverse cross-section having a respective third internal transverse dimension parallel to said respective third opening dimension, wherein said respective third internal transverse dimension is greater than said respective third opening dimension;

c) wherein said respective at least one third lumen comprises a respective longitudinally co-extensive lateral third opening, wherein said respective at least one longitudinally extending third lumen is transversely spaced at least with respect to said respective at least one longitudinally extending first lumen, and, wherein said respective third transverse cross-section is complementary to a transverse cross section of the respective at least one first longitudinal support member or the respective at least one second longitudinal support member; or d) wherein said respective at least one third lumen comprises a respective longitudinally co-extensive lateral third opening, wherein said respective at least one longitudinally extending third lumen is transversely spaced at least with respect to said respective at least one longitudinally extending first lumen, and, wherein said respective transverse third opening has a respective third opening dimension, orthogonal to the respective longitudinal axis, and wherein said respective at least one third lumen has a respective third transverse cross-section having a respective third internal transverse dimension parallel to said respective third opening dimension, wherein said respective third internal transverse dimension is greater than said respective third opening dimension, and, wherein said respective third transverse cross-section is complementary to a transverse cross section of the respective at least one first longitudinal support member or the respective at least one second longitudinal support member.

7. The system according to claim 5, wherein at least one of said first rail body or said second rail body is made from at least two respective rail body portions, including at least a respective first rail portion and a respective second rail portion, wherein the respective first rail portion and the respective second rail portion each define therein a respective one of a respective third lumen first part and a respective third lumen second part, the respective said first rail body or said second rail body having a respective assembled configuration wherein the respective first rail portion and the respective second rail portion are assembled together and the respective third lumen first part and the respective third lumen second part form the respective third lumen, and a respective disassembled configuration in which the respective third lumen first part is spaced from the respective third lumen second part and enables the respective at least one longitudinal support member to be inserted into one or the other of the respective third lumen first part or the respective third lumen second part in a non-longitudinal manner.

8. The system according to claim 7, including at least one of a), b), c), d) or e):

a) wherein said respective first rail portion and the respective second rail portion are configured for locking with respect to one another in the respective said assembled configuration;

b) wherein said respective first rail portion and the respective second rail portion are hinged with respect to one another via a respective hinge arrangement, and wherein said respective first rail portion and the respective second rail portion are pivotable via said respective hinge arrangement between said respective disassembled configuration and said respective assembled configuration;

c) wherein the respective first rail portion and the respective second rail portion each define therein a respective one of a respective first lumen first part and a respective first lumen second part, wherein in said respective assembled configuration the respective first lumen first part and the respective first lumen second part form the respective first lumen, and wherein in the respective disassembled configuration the respective first lumen first part is spaced from the respective first lumen second part;

d) wherein the respective first rail portion and the respective second rail portion each define therein a respective one of a respective second lumen first part and a respective second lumen second part, wherein in said respective assembled configuration the respective second lumen first part and the respective second lumen second part form the respective second lumen, and wherein in the respective disassembled configuration the respective second lumen first part is spaced from the respective second lumen second part; or e) wherein at least one of said at least one first lumen and said at least one second lumen is defined in the respective said first rail portion.

9. The system according to claim 1, including at least one of a), b), c), or d):

a) wherein the first sliding elements are injection molded onto the said first longitudinal edge, and wherein the second sliding elements are injection molded onto the said second longitudinal edge;

b) wherein the first sliding elements are injection molded onto the said first longitudinal edge, and wherein the second sliding elements are injection molded onto the said second longitudinal edge, and:

each said first sliding elements has a first element transverse cross-section having a first external transverse dimension parallel to said first opening dimension, wherein said first external transverse dimension is less than said first internal transverse dimension and greater than said first opening dimension;

each said second sliding elements has a second element transverse cross-section having a second external transverse dimension parallel to said second opening dimension, wherein said second external transverse dimension is less than said second internal transverse dimension and greater than said second opening dimension;

c) wherein the first sliding elements and the second sliding elements are made from or coated with a low friction material; or d) wherein at least one of said first longitudinal edge and said second longitudinal edge comprises a respective cord at the edge thereof.

10. The system according to claim 1, including one of a) or b):

a) wherein the flexible sheet material is in the form of an open mesh material;

b) wherein the flexible sheet material is in the form of an open mesh material, and, wherein the flexible sheet material is in the form of a net.

11. The system according to claim 1, wherein the first bobbin is configured for selectively and alternately retracting and deploying the strip panel element with respect to the first rail element and the second rail element by selectively respectively coiling and uncoiling the strip panel element with respect to the first bobbin.

12. The system according to claim 11, wherein the first bobbin is located at the first module longitudinal end, wherein the first longitudinal end of the strip panel element is fixed to the first bobbin, and wherein the second longitudinal end of the strip panel element comprises a cable element windable about a winding element having a winding axis, wherein the first bobbin is selectively rotatable about the first bobbin axis in a first direction for coiling the strip panel element thereonto, and wherein the cable element windable about the winding axis in a second direction for uncoiling the strip panel element from the first bobbin.

13. The system according to claim 12, including one of a) or b):
   a) wherein the winding axis is co-axial with the first bobbin axis, and wherein the cable element is looped around a pulley arrangement at the second module longitudinal end between the second longitudinal end of the strip panel element and the winding element; or
   b) wherein the winding axis is co-axial with the first bobbin axis, and wherein the cable element is looped around a pulley arrangement at the second module longitudinal end between the second longitudinal end of the strip panel element and the winding element, and, further comprising a first powered drive coupled to the first bobbin and to the winding element, and wherein said first direction is opposed to said second direction.

14. The system according to claim 12, including one of a) or b):
   a) wherein the winding element is located at the second module longitudinal end;
   b) wherein the winding element is located at the second module longitudinal end, and, further comprising a first powered drive coupled to the first bobbin and a second powered drive coupled to the winding element.

15. The system according to claim 1, further comprising:
   a first plurality of first vertical support members, affixed to and supporting the first rail element in vertically spaced relationship with respect to the zone, and
   a second plurality of second vertical support members, affixed to and supporting the second rail element in vertically spaced relationship with respect to the zone.

16. System according to claim 1, comprising at least one pair of adjacent juxtaposed said module, each said pair including a first said module and a second said module, wherein a respective said second rail element of the first module is concurrently the respective said first rail element of the second module.

17. A method for reversibly covering a zone, comprising:
   providing the system as defined in claim 1;
   selectively deploying the strip panel element over the ground zone.

18. The method according to claim 17, further comprising:
   selectively retracting the strip panel element from over the ground zone.

* * * * *